United States Patent [19]

Okubo

[11] Patent Number: 5,337,296

[45] Date of Patent: Aug. 9, 1994

[54] APPARATUS AND METHOD FOR SEARCHING A TARGET TIME CODE RECORDED ON DISKS

[75] Inventor: Hirotoshi Okubo, Tokorozawa, Japan

[73] Assignee: Pioneer Electronic Corporation, Tokyo, Japan

[21] Appl. No.: 67,632

[22] Filed: May 25, 1993

[30] Foreign Application Priority Data

May 29, 1992 [JP] Japan .................................. 4-139484

[51] Int. Cl.$^5$ .............................................. G11B 7/00
[52] U.S. Cl. ...................................... 369/32; 358/337
[58] Field of Search ................. 369/83, 84, 32, 44.28; 360/13, 15, 14.3, 14.2, 36.1; 358/311, 337

[56] References Cited

U.S. PATENT DOCUMENTS

| | | | |
|---|---|---|---|
| 4,360,841 | 11/1982 | Mita | 360/14.3 |
| 4,612,569 | 9/1986 | Ichinose | 369/83 |
| 5,091,899 | 2/1992 | Adachi et al. | 369/83 |
| 5,146,448 | 9/1992 | Adachi et al. | 369/83 |
| 5,218,672 | 6/1993 | Morgan et al. | 360/14.3 |

*Primary Examiner*—Robert J. Pascal
*Assistant Examiner*—Tan Dinh
*Attorney, Agent, or Firm*—Kane, Dalsimer, Sullivan, Kurucz, Levy, Eisele and Richard

[57] ABSTRACT

A device for searching a target time code recorded on a disk with continuous frame addresses includes: a pick up for reproducing information including current time code and current frame address corresponding to a current reproduction position of the pickup from the disk, unit for calculating a time code difference between the target time code and the current time code reproduced by the pickup, unit for setting a target frame address on the basis of the calculated time code difference and the current frame address reproduced by the pickup, unit for calculating shift information including a shift distance and a shift direction from the current reproduction position to the position of the target frame address on the basis of the target frame address and the current frame address, unit for shifting the pickup on the basis of the shift information, unit for storing the current frame address when the shifting unit shifts the pickup in an outer peripheral direction of the disk, and unit for allowing the pickup to continuously reproducing information from the disk from the position of the current frame address stored in the storing unit when the shift distance becomes within a predetermined distance value or when the time code difference becomes within a predetermined difference value until the current reproduction position reaches the reproduction position whose time code is near the target time.

6 Claims, 11 Drawing Sheets

APPARATUS AND METHOD FOR SEARCHING A TARGET TIME CODE RECORDED ON DISKS

BACKGROUND OF THE INVENTION

1. Field of the Invention

This invention relates to a device for and a method of searching time code recorded on a disk-shaped recording medium on which discontinuous time codes are recorded.

2. Description of Prior Art

When picture information is recorded on a recording medium such as an optical disk or the like, it has been generally used a method in which time codes representing hour, minute, second and frame information are beforehand recorded on the recording medium together with the picture information, and an editing work of recorded information is carried out using these time codes to improve efficiency of the editing work. In the following description, a time code representing the time of 0 hour 0 minute 0 second 1 frame is expressed as "00:00:00:01".

The time codes can be freely set to any values, and thus it is frequent case that plural pieces of information are recorded on a recording medium with time codes having discontinuous values. For example, there is a case where a first information is recorded in a first recording area with time codes from "00:00:00:01" to "00:20:00:00" while a second information is recorded on a second recording area, adjacent to the first recording area, with time codes from "10:00:00:00" to "10:15:00:00". In this case, the time code "10:00:00:00" is recorded subsequently to the time code "00:20:00:00" at the boundary of the first and second recording areas, and thus the time code sequence becomes discontinuous at the boundary. Further, since the time code can be arbitrarily set, the each time codes set for the recorded information are not necessarily aligned on the recording medium in such a manner that the values thereof are gradually increased in a recording direction of the recording medium (for example, in a direction from the innermost peripheral side of an optical disk to the outermost peripheral side thereof). In addition, even when continuous time codes are recorded over the whole recording area of a recording medium, if the recorded information is edited and recorded on a new recording medium, the time codes recorded on the new recording medium become discontinuous.

In searching for a recording position of a desired time code in a conventional disk-type recording medium reproducing device such as a video disk player or the like, the time code search is carried out using frame addresses which are beforehand recorded on a disk-shaped recording medium (hereinafter referred to as "disk") used exclusively for reproduction (hereinafter referred to as "reproduction-only disk"). Here, "frame address" indicates an absolute address which is assigned to each frame or each track. For example, for a constant angular velocity (CAV) having a diameter of 30 cm, continuous frame addresses of "1" to "54000" are assigned in correspondence to first to 54000th tracks. The time codes are determined in accordance with the frame addresses in one-to-one correspondence. For example, for the above CAV disk, frame addresses "1" to "54000" correspond to the time codes "00:00:00:01" to "00:30:00:00" Therefore, as shown in FIG. 1, in a reproduction-only disk, the time codes can be easily converted to corresponding frame addresses.

An operation of the time code search will be described hereunder with reference to FIG. 2.

The disk-shaped recording medium reproducing device includes a pickup 1. The pickup 1 reads out an RF signal including a recorded picture information from a recording disk, and the read-out RF signal is supplied to a demodulator 2. The demodulator 2 demodulates the RF signal read out by the pickup 1 into a picture signal which includes information such as a frame address, a time code, on a vertical blanking period and supplies the demodulated signal to a frame address detection device (referred to as "FA detection device 3").

The frame address detection device 3 detects a frame address on the basis of the demodulated signal and supplies the frame address to a latch 7. For example, the frame address detection circuit 3 detects the frame address "10000" and supplies it to the latch 7. A key input device 5 is provided with, for example, a push button on a front panel (not shown). The key input device receives a user's input of time code to be searched and outputs the inputted time code to a conversion device 6. For example, the key input device 5 supplies a time code="00:10:00:00" to the conversion device 6.

The conversion device 6 converts the time code supplied from the key input device 5 into a frame address. For example, a time code="00:10:00:00" is converted to the corresponding frame address="18000". This frame address="18000" becomes a target frame address for search, and is supplied to a comparator 8.

When a switch SW1 on a front panel (not shown) is set to a closed state, a time code search start signal which is usually in a "H"-level is set to a "L"-level during the closed state of the switch SW1. A search start signal generator (MMV: Mono-Multi Vibrator) 4 detects the trailing edge of the time code search start signal and supplies a search start signal having a predetermined pulse width to the latch 7 and a search control device 9.

Upon receipt of the search start signal, the latch 7 detects the rising edge of the search start signal to latch a frame address corresponding to a current reproducing position of the pickup 1 (hereinafter referred to as "current frame address") at the timing of the rising edge. For example, a frame address="10000" is latched as a current frame address. The latched current frame address is supplied to the comparator 8 to compare the inputted current frame address with the target frame address which has been previously fed to the comparator 8, and a difference between the current frame address and the target frame address (="+8000") is supplied to the search control device 9. The absolute value of the difference (="8000") represents a distance at which the reproducing position of the pickup 1 should be shifted (hereinafter referred to as "shift distance"), and a sign (polarity)="+"located before the numeral represents a direction to be shifted (hereinafter referred to as "shift direction"). In the following description, the polarity "+"represents the shift of the reproducing position of the pickup 1 in an outer peripheral direction of the disk (i.e., toward the outermost peripheral side of the disk), and the polarity "−" represents the shift of the reproducing position of the pickup 1 in an inner peripheral direction of the disk (i.e., toward the innermost peripheral side of the disk).

The search control device 9 includes a direction setting device 9a, a comparator 9b, a shift amount detection device 9c, a speed setting device 9d and a search termination signal generator 9e. The direction setting device 9a sets a shift direction of the pickup 1 in a radial direction of the disk on the basis of the polarity of the difference supplied from the comparator 8, and the output thereof is transmitted to a driver circuit 10 for controlling a slider motor. The comparator 9b outputs a shift distance supplied from the comparator 8. The shift amount detection device 9c includes a position detector, a counter for counting a detection pulse of the position detector, etc., and detects and outputs a shift amount. The speed setting device 9d sets a proper shift speed for the difference signal (residual or remaining shift distance) between the output of the comparator 9b and the output of the shift amount detection device 9c, and an output signal thereof is supplied to the drive circuit 10 to drive the slider motor 11 on the basis of this signal.

Upon receipt of the search start signal, the output of the search termination signal generator 9e is set to "H"-level. In response to this signal, the drive circuit 10 outputs the control signal to the slider motor 11, and the pickup 1 starts moving in the radial direction of the disk in accordance with the output signal of the drive circuit 10. According to the shift of the pickup 1, the output of the shift amount detection device 9c is varied, and remaining shift distance obtained from the comparator 9b is decreased. The shift speed corresponding to the remaining shift distance is set in the speed setting device 9d, and the slider motor 11 is controlled in accordance with the set shift speed. Upon detection of the state that the remaining shift distance becomes equal to "0" on the basis of the signal from the comparator 9b, the search termination signal generator 9e outputs a "L"-level search termination signal. The search termination signal is supplied to the drive circuit 10 and a tracking control device (not shown). As a result, the output of the control signal from the drive circuit 10 is inhibited or fixed to a predetermined constant level. Upon receipt of the search termination signal, the tracking control device (not shown) carries out a tracking control and the search operation is terminated.

In the searching method as described above, it is necessary that the time codes are continuously recorded proportional to the frame addresses so as to be easily converted to the frame addresses. As a result, this method is not applicable to a recording medium such as an edited medium after edition in which the time codes are not recorded proportionally or in one-to-one correspondence to the frame addresses.

SUMMARY OF THE INVENTION

It is an object of this invention to provide a device for and a method of easily searching a desired time code recording position of a recording medium even if the time codes are discontinuously recorded on the recording medium.

According to one aspect of the present invention, there is provided a device for searching a target time code recorded on a disk on which time codes and continuous frame addresses are recorded, the device including: a pick up for reproducing information including current time code and current frame address corresponding to a current reproduction position of the pickup from the disk, unit for calculating a time code difference between the target time code and the current time code reproduced by the pickup, unit for setting a target frame address on the basis of the calculated time code difference and the current frame address reproduced by the pickup, unit for calculating shift information comprising a shift distance and a shift direction from the current reproduction position to the position of the target frame address on the basis of the target frame address and the current frame address, unit for shifting the pickup on the basis of the shift information, unit for storing the current frame address when the shifting unit shifts the pickup in an outer peripheral direction of the disk, and unit for allowing the pickup to continuously reproducing information from the disk from the position of the current frame address stored in the storing unit when the shift distance becomes within a predetermined distance value or when the time code difference becomes within a predetermined difference value until the current reproduction position reaches the reproduction position whose time code is near the target time.

According to another aspect of the present invention, there is provided a method of searching a target time code recorded on a disk by a pickup on which time codes and continuous frame addresses are recorded, the method including the steps of: reproducing information including current time code and current frame address corresponding to a current reproduction position of the pickup from the disk, calculating a time code difference between the target time code and the current time code reproduced by the pickup, setting a target frame address on the basis of the calculated time code difference and the current frame address reproduced by the pickup, calculating shift information comprising a shift distance and a shift direction from the current reproduction position to the position of the target frame address on the basis of the target frame address and the current frame address, shifting the pickup on the basis of the shift information, storing the current frame address when the pickup is shifted in an outer peripheral direction of the disk, repeating the information reproducing step to storing step until the shift distance becomes within a predetermined distance value or the time code difference becomes within a predetermined difference value, and allowing the pickup to continuously reproducing information from the disk from the position of the current frame address stored in the storing unit until the current reproduction position reaches the reproduction position whose time code is near the target time.

According to the present invention, in the search operation, when the shift distance is within the predetermined value or when the time code difference is within the predetermined value, the continuous reproduction from the stored current frame address stored is carried out by the pickup, thereby performing the search operation of the recording position of the target time code or the recording position of the time code having the value near to the target time code.

Accordingly, even when time codes are discontinuously recorded on the recording medium, a desired time code recording position can be easily searched.

DETAILED DESCRIPTION OF PREFERRED EMBODIMENTS

A preferred embodiment of the present invention will be described with reference to FIGS. 3 to 15.

Figure 1:
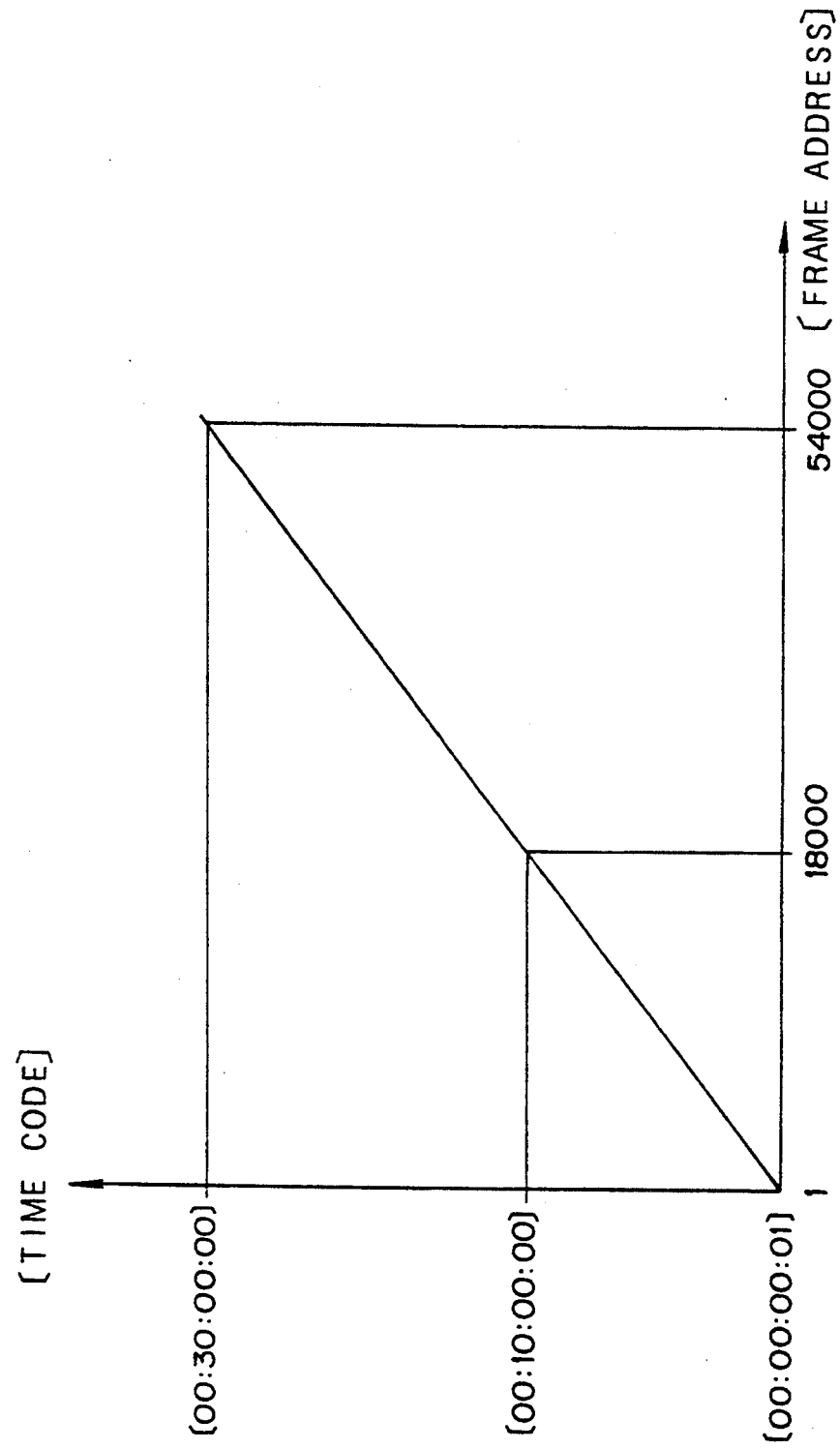
FIG. 1 is a diagram showing the correspondence between frame addresses and continuous time codes.
Figure 2:
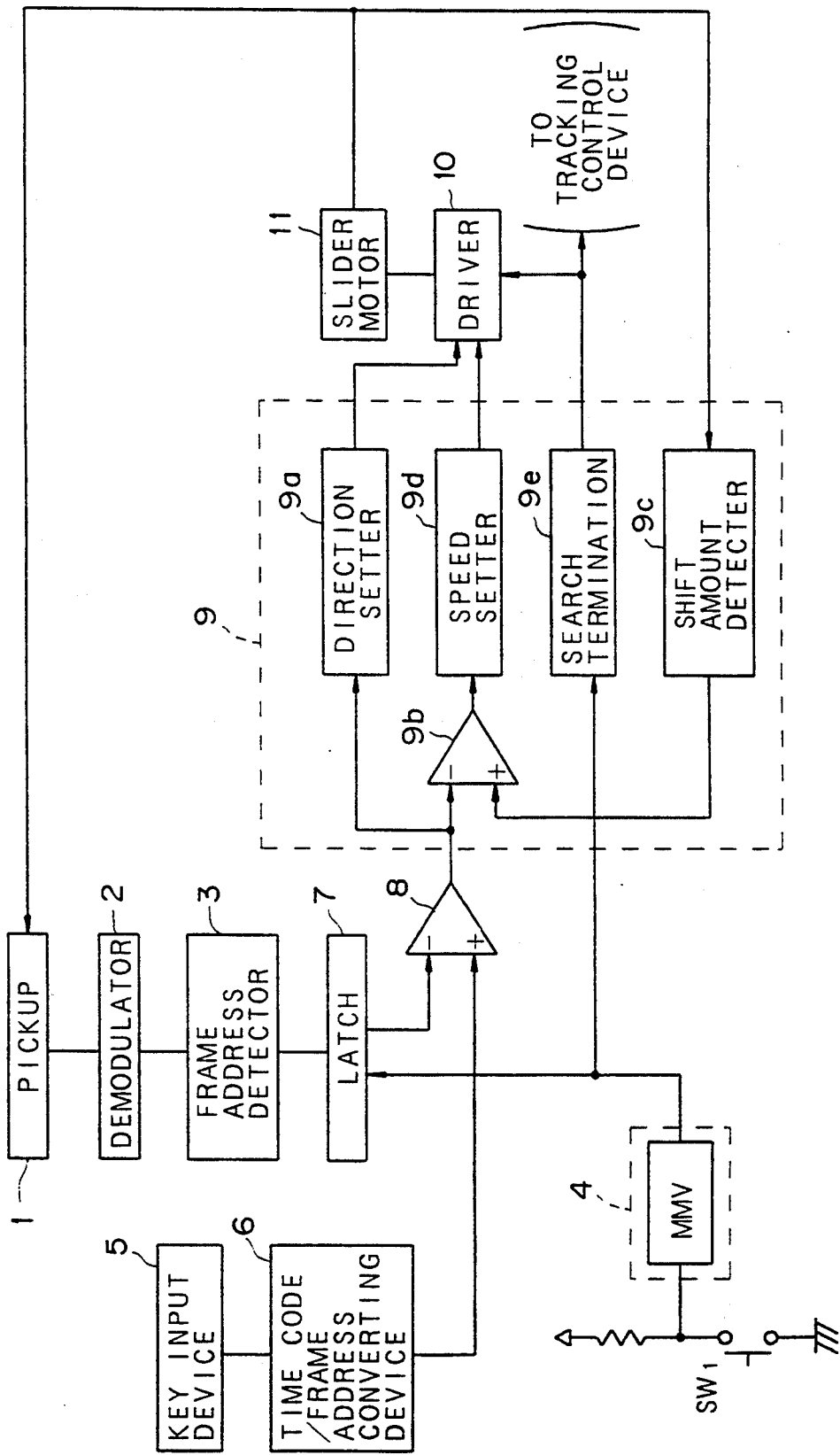
FIG. 2 is a block diagram showing the operation of conventional time code search method.
Figure 3:
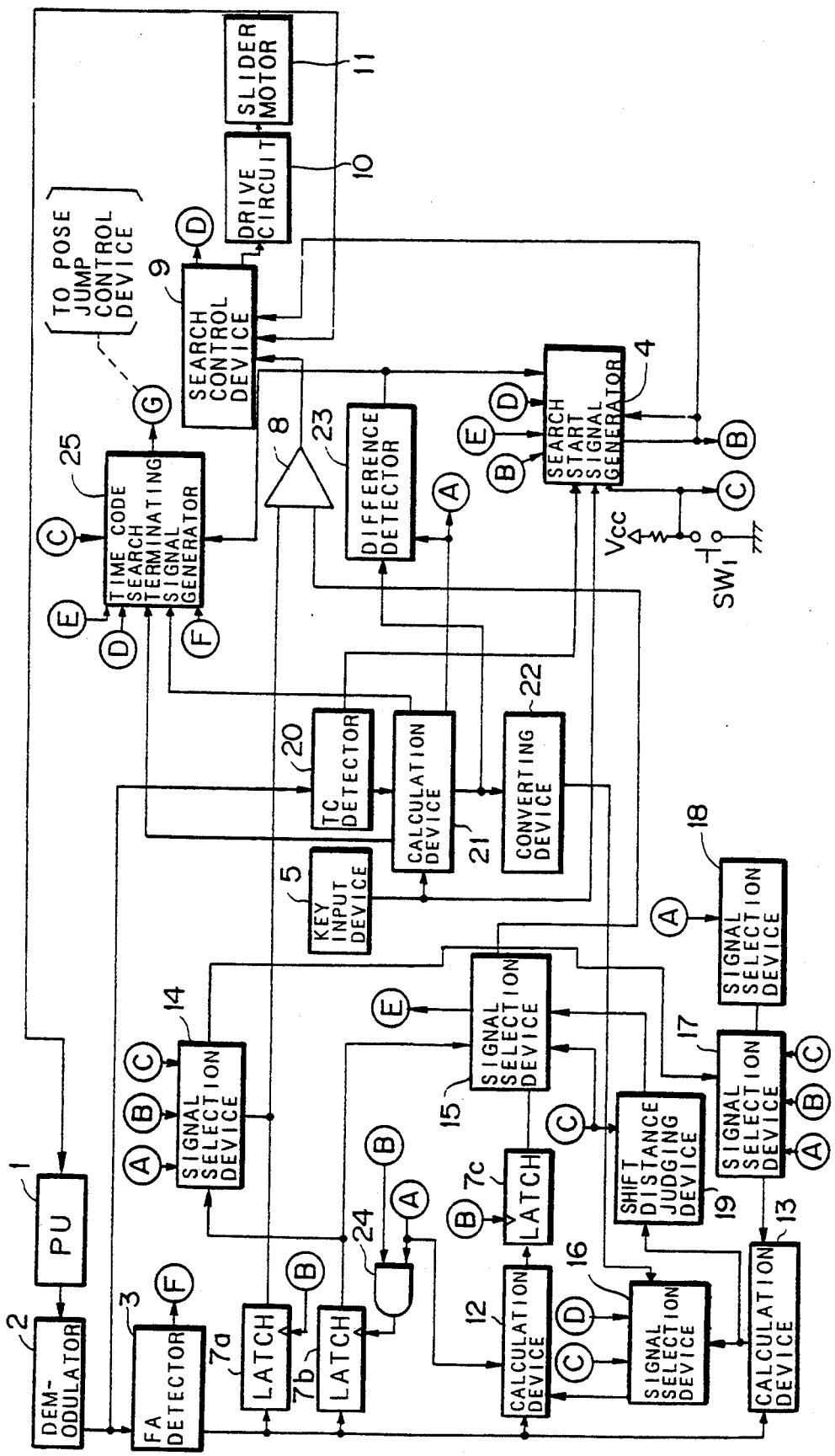
FIG. 3 is a block diagram showing the construction of an embodiment according to this invention.

FIG. 3 is a block diagram which schematically shows the construction of an optical disk reproducing device. The same elements as the device shown in FIG. 2 are represented by the same reference numerals, and the detailed description thereof is eliminated without repeating the description.

In FIG. 3, the frame address detection device (represented as "FA detector" in FIG. 3) detects a frame address from a demodulation signal supplied through the pickup 1 and the demodulator 2, and transmits, to a counting device 25c (see FIG. 13) as described later, a pulse signal keeping "H"-level for a predetermined time as a one-detection judging signal at every detection of one frame address.

Figure 4:
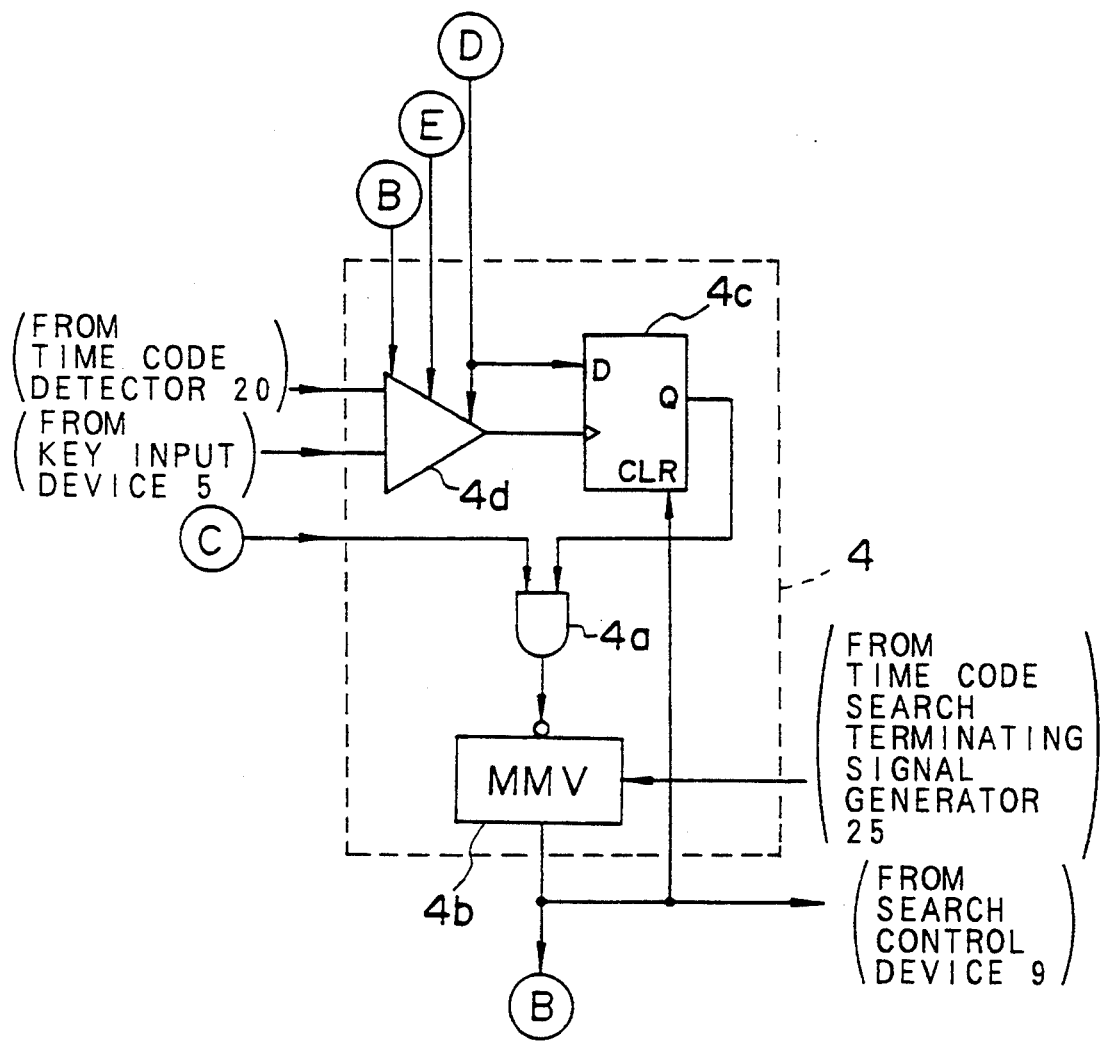
FIG. 4 is a block diagram showing the detailed construction of a search start signal generator.
Figure 5:
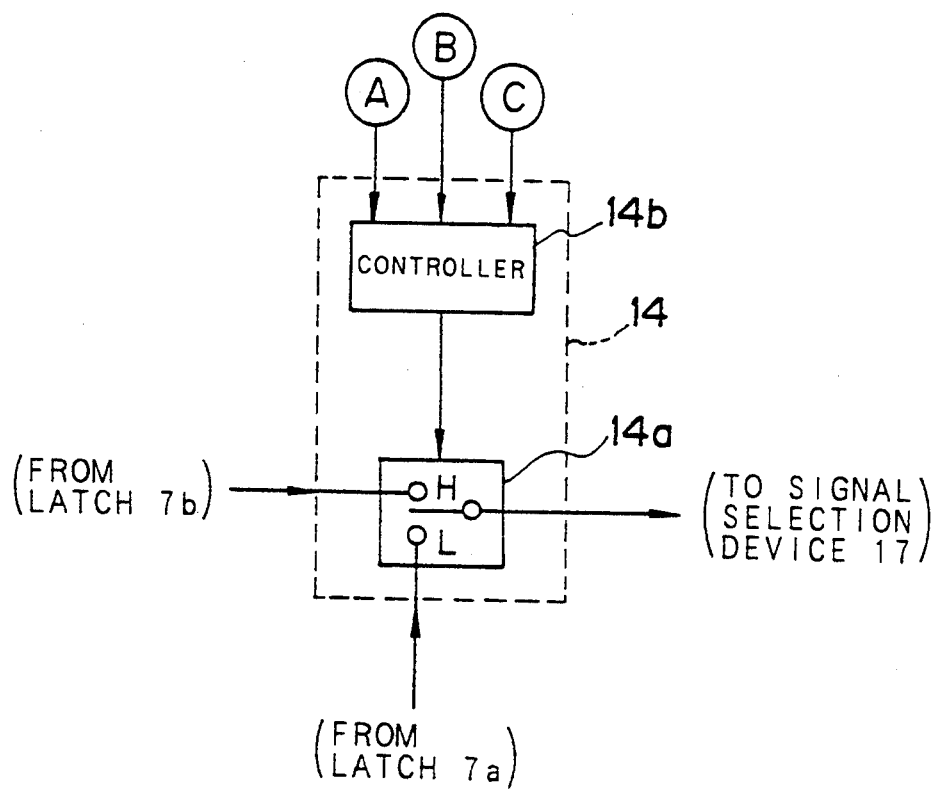
FIG. 5 is a block diagram showing the detailed construction of a signal selection device.
Figure 6:
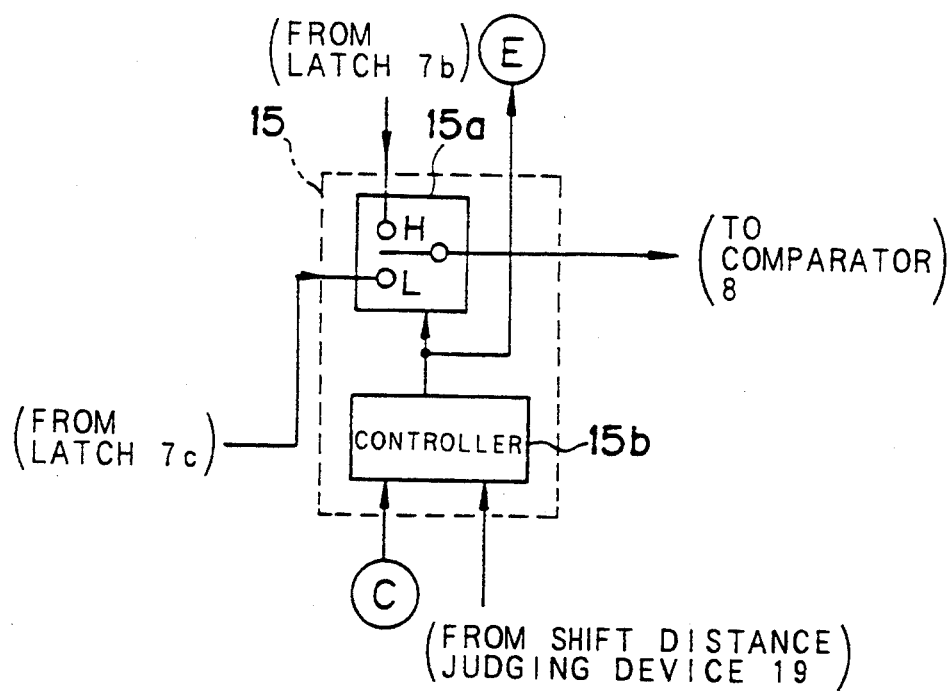
FIG. 6 is a block diagram showing the detailed construction of another signal selection device.
Figure 7:
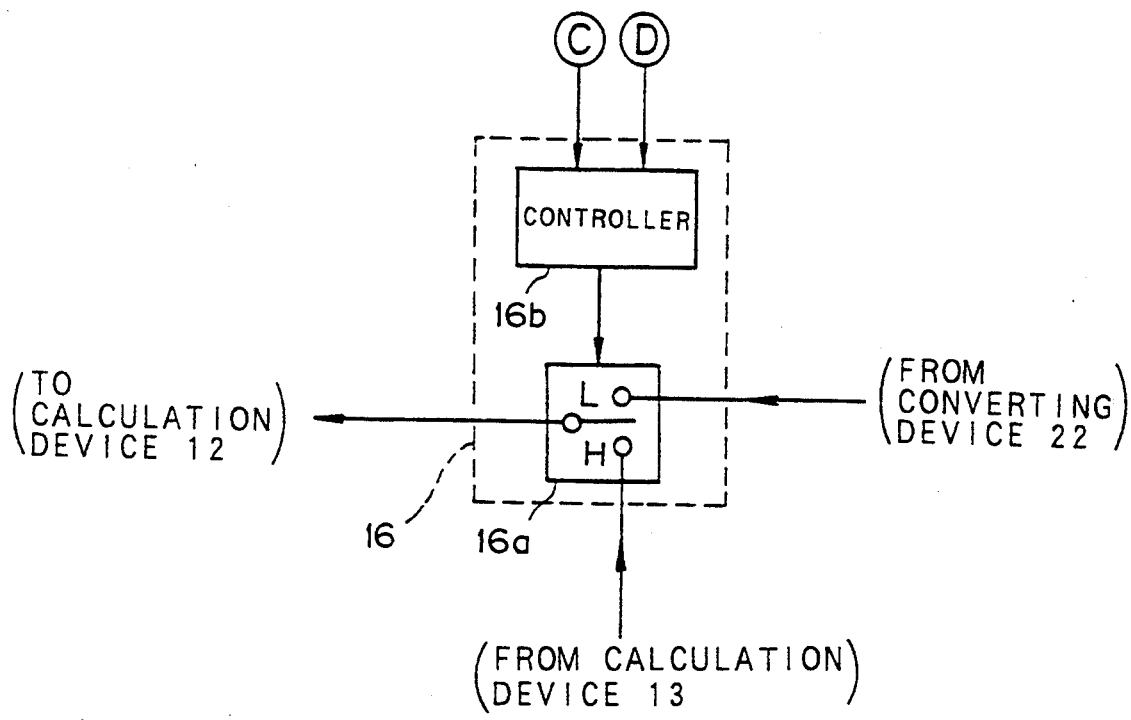
FIG. 7 is a block diagram showing the detailed construction of still another signal selection device.
Figure 8:
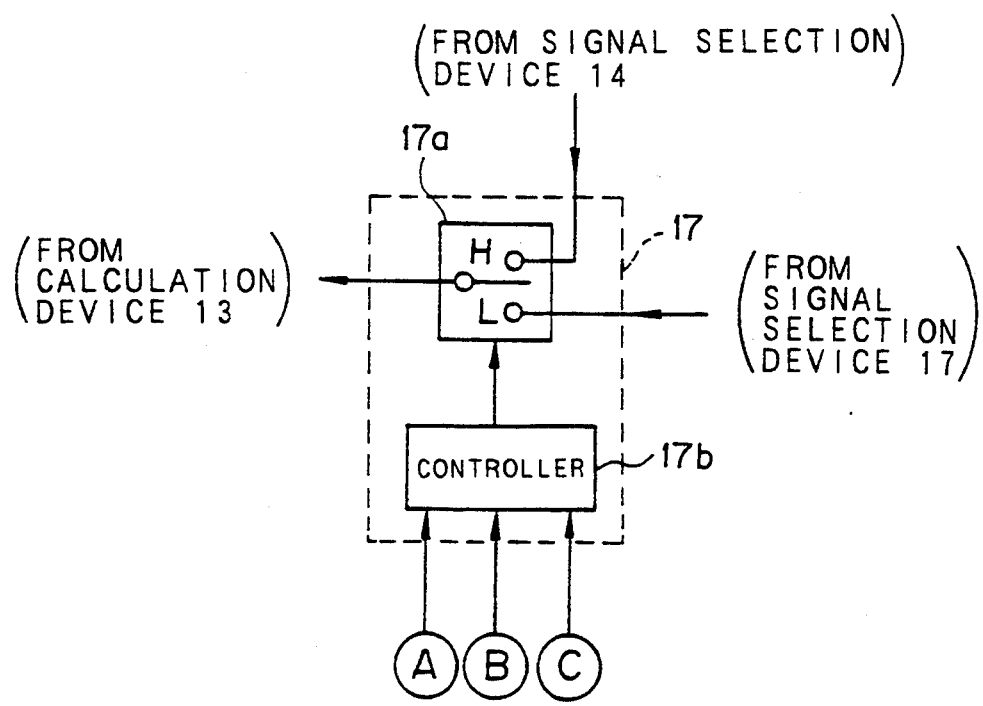
FIG. 8 is a block diagram showing the detailed construction of still another signal selection device.

The search start signal generator 4 includes a gate 4a, an MMV 4b, a latch 4c and a comparator 4d as shown in FIG. 4. For example, when a time code search start signal C is supplied from the switch SW1 or the like on the front panel, the time code search start signal C is inputted through the gate 4a to the MMV 4b. The MMV 4b outputs a search start signal B having a predetermined pulse width to the latches 4c, 7a and 7c, the comparator 4d, the search control device 9, a change-over control device 14b (see FIG. 5) and the gate 24 at the trailing edge of the time code search start signal C. The latch 4c and the comparator 4d are in a reset state during the "H"-level period of the search start signal B, and the output signal supplied from the latch 4c to the gate 4a is set to "H"-level and the output of the comparator 4d is set to "L"-level. At the termination time of the search, the comparator 4d outputs a "H"-level signal if a time code to be searched (hereinafter referred to as "target time code") is incoincident with a time code of a current frame address which is supplied from the time code detection device 20 and at which the pick up 1 is currently located (hereinafter referred to as "current time code"). This output signal is transmitted to the latch 4c, and at the rising edge of the output signal of the comparator 4d, the latch 4c transmits a "L"-level output signal through the gate 4a to the MMV 4b to generate a next search start signal B. However, when a control signal E of a change-over control device 15b (see FIG. 6) as described later is set to "H"-level, the output of the comparator 4d is set to be an inhibited state, by a next search terminating signal D, and thus no search start signal B is outputted. Further, the output of the MMV 4b is also set to the inhibited state when the output signal of a difference detection device 23 as described later is set to "H"-level, and thus no search start signal B is outputted.

The latch 7b latches the current frame address on the basis of the search start signal B supplied through the gate 24, and transmits its output to signal selection devices 14 and 15. The other input terminal of the gate 24 is supplied with a sign signal A outputted from a calculation device 21 as described later, and the search start signal B is fed to the latch 7b when the signal A is in a "H"-level, that is, when the slider is moved in the outer peripheral direction. In short, the latch 7B latches the current frame address at the start time of the newest search in the outer peripheral direction.

The latch 7c latches the output of the calculation device 12 on the basis of the search start signal B, and transmits it to the signal selection device 15. The calculation device 12 carries out addition and subtraction calculations between the current frame address and the output from the signal selection device 16 on the basis of the sign signal A supplied from a calculation device 21 as described later. For example, the addition calculation is carried out when the sign signal A is in "H"-level which corresponds to "+" sign while the subtraction calculation is carried out when the sign signal A is in "L"-level which corresponds to "−" sign. The calculation result is supplied to the latch 7c.

The calculation device 13 carries out the subtraction between the current frame address and the output of the signal selection device 17, divides the subtraction result by "2", and then transmits the calculation result to the signal selection device 16 and the comparator 19. This calculation result corresponds to a shift distance in a next search operation.

The signal selection devices 14, 15, 16 and 17 includes change-over switches 14a, 15a, 16a and 17a and change-over control devices 14b, 15b, 16b and 17b as shown in FIGS. 5, 6, 7 and 8, respectively. Each of the change-over control devices 14b, 15b, 16b and 17b includes a plurality of logical circuits, and each of the change-over control devices 14b, 15b, 16b and 17b is reset while the time code search start signal C is in "L"-level, and transmits a "L"-level signal to each change-over switches 14a, 15a, 16a and 17a.

The change-over control device 14b supplies a "H"-level signal to the change-over switch 14a when a sign signal A transmitted from a calculation device 21 as described later is continuously set to "L"-level twice or more times in the search operation, and holds the "H"-level signal until the "H"-level signal is inputted as the sign signal A. Upon detection of the rising edge of the output signal of the comparator 19a, the change-over control device 15b outputs a "H"-level signal and holds the "H"-level signal until it receives the time code search start signal C again. Upon receipt of a first search terminating signal D after the receipt of the time code search start signal C, the change-over control device 16b outputs a "H"-level output signal and holds the "H"-level signal until it receives the time code search start signal C again.

The change-over control device 17b is supplied with the sign signal A outputted from the calculation device 21 in addition to the time code search start signal C and the search start signal B. The change-over control device 17b compares the sign signal A at the first input time of the search start signal B after the input of the time code search signal B with the sign signal A subsequently obtained. And the change-over control device 17b outputs a "H"-level signal when the polarity of a sign signal A subsequently supplied is reversed in comparison with the polarity of the sign signal A at the first input time of the search start signal B, and holds the "H"-level signal until the time code search start signal C is inputted again.

Figure 9:
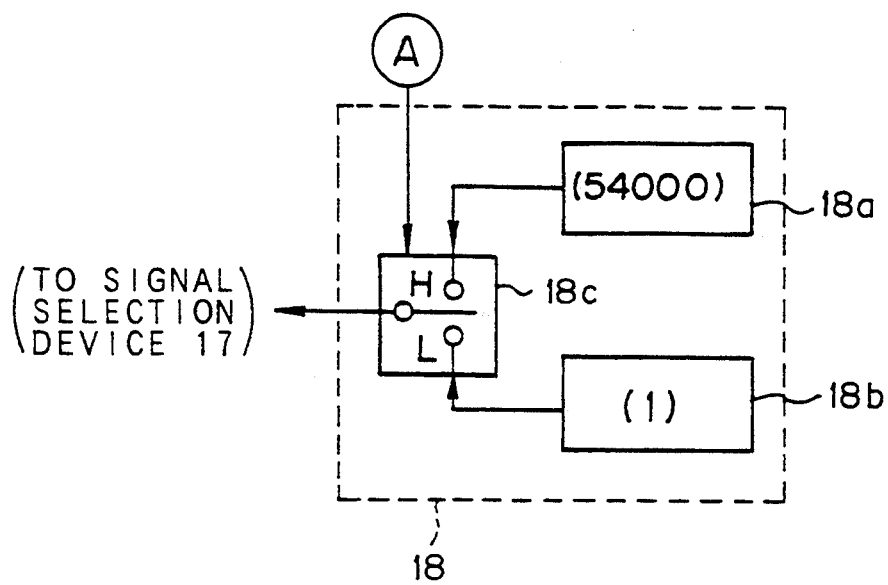
FIG. 9 is a block diagram showing the detailed construction of still another signal selection device.

As shown in FIG. 9, the signal selection device 18 includes an outer-peripheral direction address setting device 18a, an inner-peripheral direction address setting device, and a change-over switch 18c. For example, to the outer-peripheral direction address setting devices 18a, the maximum frame address="54000" is set, and to the inner-peripheral direction address setting devices 18b, the minimum frame address="1" is set. The change-over switch 18c is controlled by the sign signal A outputted from the calculation device as described later.

Figure 10:
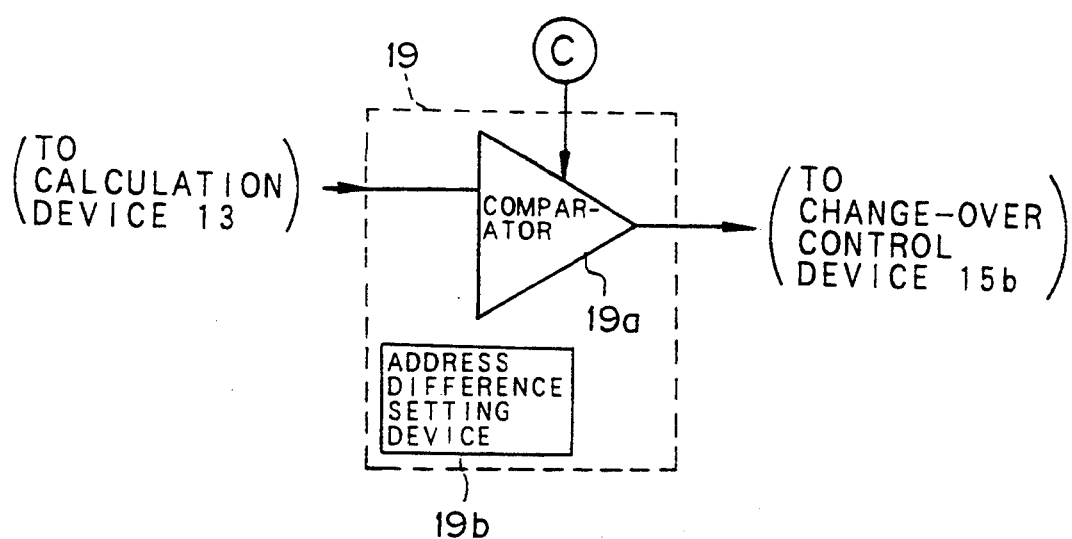
FIG. 10 is a block diagram showing the detailed construction of a shift distance judging device.

As shown in FIG. 10, the shift distance judging device 19 includes a comparator 19a, and an address difference setting device 19b. The comparator 19a is kept to be a reset state while the time code search start signal C is at "L"-level, and transmits an output signal of "H"-level to the change-over control device 15b when the shift distance outputted from the calculation device 13 becomes smaller than a value set by the address difference setting device 19b, for example "6" frame address.

The time code detection device 20 (represented as "TC detector" in FIG. 3) detects a time code from the demodulation signal obtained through the pickup 1 and the demodulator 2.

Figure 11:
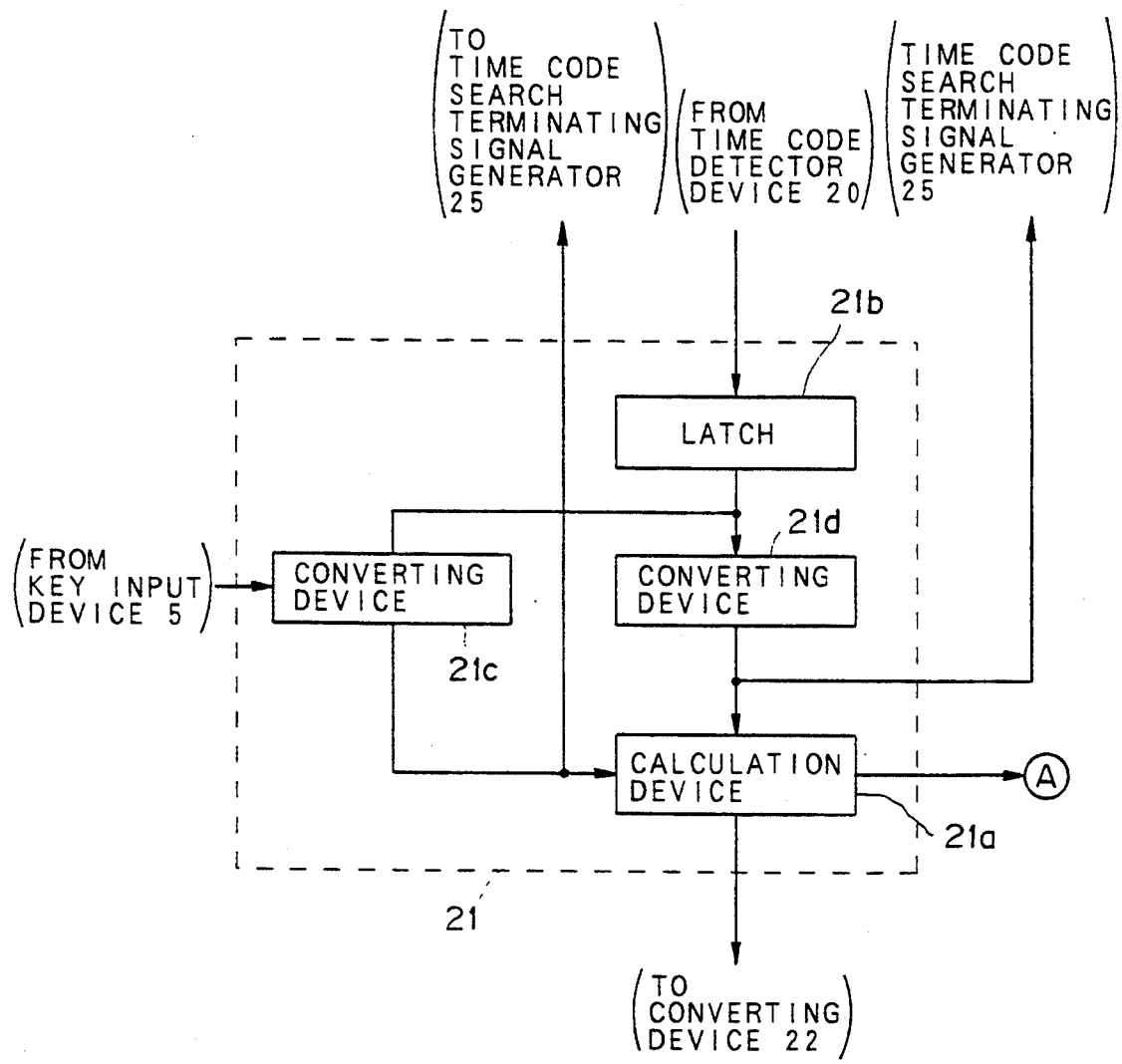
FIG. 11 is a block diagram showing the detailed construction of a calculation device.

As shown in FIG. 11, the calculation device 21 includes a calculation device 21a, a latch 21b and converting devices 21c and 21d. The latch 21b latches the current time code at the start time of the time code search and transmit it to the converting devices 21c and 21d. The converting devices 21c and 21d converts, on the assumption of the time code supplied from the latch 21b at the start of the time code search as "00:00:00:01", the target time code supplied from the key input device 5 and the current time code obtained by the time code detection device 20 into time codes each of which has a value within ±12 hours with respect to the time code obtained from the latch 21b. For example, it is assumed that the time code search is started at a certain time. In this case, assuming that the time code supplied from the latch 21b is "10:00:00:01", the target time code supplied from the key input device 5 is "21:00:00:00" and the current time code supplied from the time code detection device 20 is "05:00:00:00", the calculation devices 21c and 21d perform conversion calculations on the basis of the following equations (1) and (2), respectively.

$$(target\ time\ code) - (time\ code\ of\ latch\ 21b) \quad (1)$$

$$(current\ time\ code) - (time\ code\ of\ latch\ 21b) \quad (2)$$

Accordingly, "11:00:00:00" is outputted from the converting device 21c and "−05:00:00:00" is outputted from the converting device 21d. The calculation device 21a carries out the subtraction between the converted target time code which is obtained by the converting device 21c and the converted current time code which is obtained by the converting device 21d, and outputs the absolute value and the sign signal A. The sign signal A is set to "H"-level when the subtraction result has a positive value and to "L"-level when the subtraction result has a negative value. The sign signal A is supplied to each device as described above.

The converting device 22 converts the time code difference between the converted current time code and the converted target time code each outputted from the calculation device 21 into the difference value of the frame address.

Figure 12:
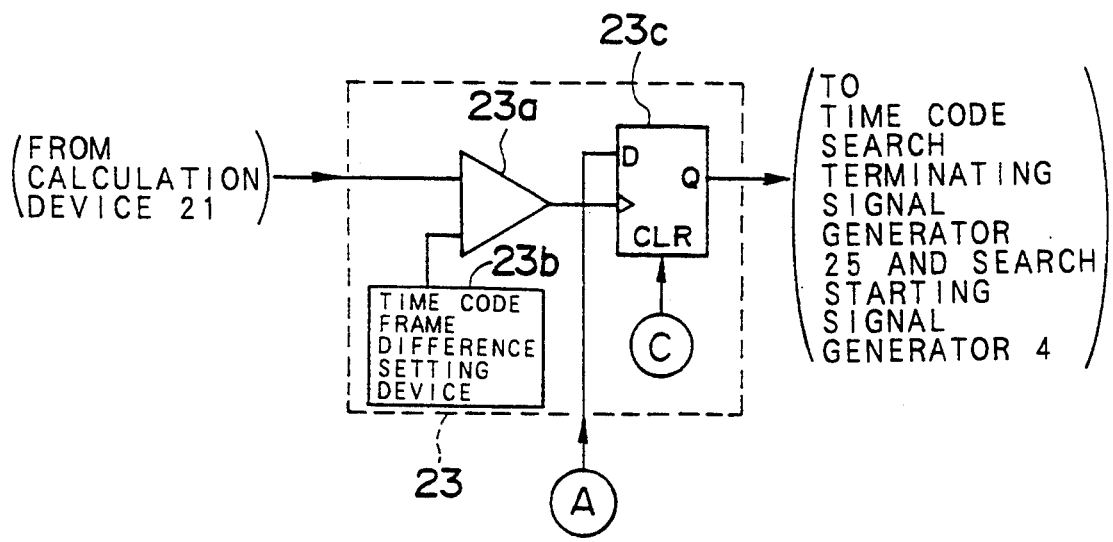
FIG. 12 is a block diagram showing the detailed construction of still another calculation device.

As shown in FIG. 12, the time code frame difference detection device 23 includes a comparator 23a, a difference setting device 23b and a latch 23c. When it is detected that the time code difference obtained by the calculation device 21 is within a predetermined frame value set by the difference setting device 23b (for example, 12 frames), the comparator 23a outputs a "H"-level signal to the latch 23c. The latch 23c is set to be a reset state while the time code search start signal C is in "L"-level. When the sign signal A is in "L"-level and the current time code is within the range of the predetermined frame value (for example, 12 frames) from the target time code, that is, when the rising edge of the signal supplied from the comparator 23a is detected, the latch 23c transmits "H"-level signal to the MMV 4b and the time code search terminating signal generator 25.

Figure 13:
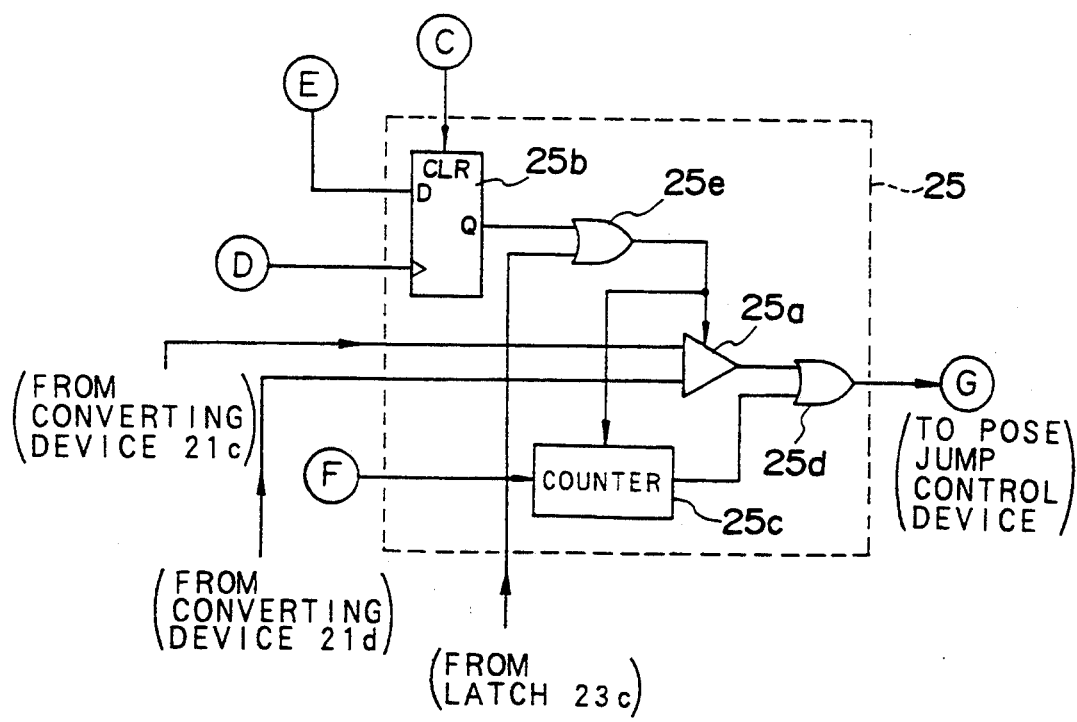
FIG. 13 is a block diagram showing the detailed construction of a time code search terminating signal generator.

As shown in FIG. 13, the time code search terminating signal generator 25 includes a comparator 25a, a controller 25b, a counter 25c, gates 25d and 25e. The controller 25b is set to a reset state while the time code search start signal C is in "L"-level so as to inhibit the output of the comparator 25a and the counter 25c by the gate 25e. The controller 25b releases the inhibition state of the output of the comparator 25a and the counter 25c when the output signal of the latch 23c supplied to the time code search terminating signal generator 25 is set to "H"-level. Alternately, the controller 25b releases the inhibition state of the output of the comparator 25a and the counter 25c on the basis of a next search termination signal D when a "H"-level control signal E is inputted from the change-over control device 15b. The comparator 25a compares the converted current time code outputted from the converting device 21d and the converted target time code output from the converting device 21c, and outputs a "H"-level signal through the gate 25d to a pose jump control device (not shown) as a time code search terminating signal G when the converted current time code is larger than the converted target time code.

The counter 25c starts counting a detection judging signal F supplied from the frame address detection device 3 when the output of the controller 25b rises to "H"-level, and outputs a "H"-level signal through the gate 25d to the pose jump control device (not shown) when the counting operation is carried out at a predetermined number of times.

Next, the operation of this embodiment will be described hereunder with reference to FIGS. 3 to 15. The following description is representatively described for a case where a time code search from a current time code "00:00:00:01" (current address 10000) to a target time code "00:10:00:00" is carried out.

Figure 14:
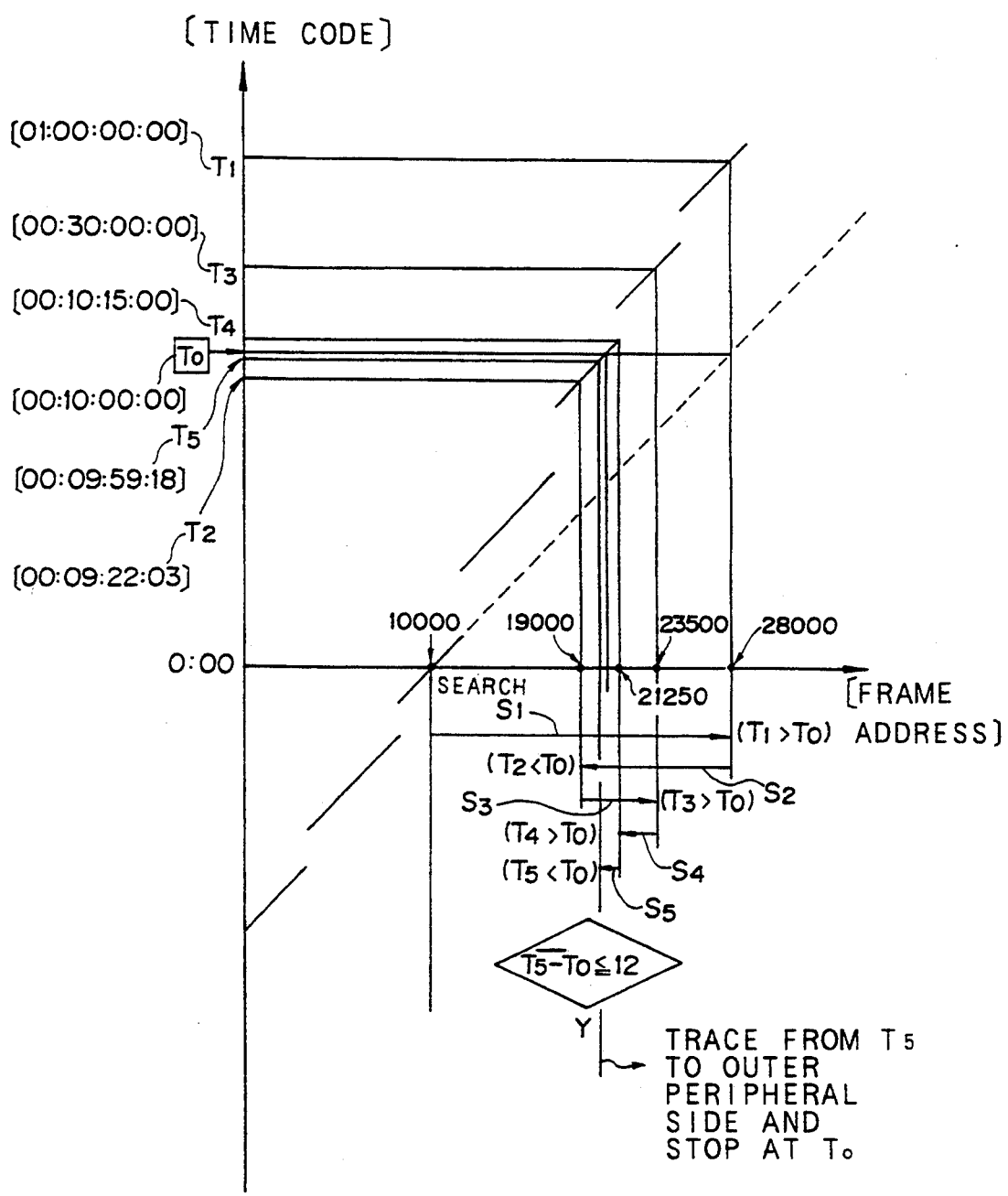
FIG. 14 is a diagram showing an example of a time code recording manner on a disk.
Figure 15:
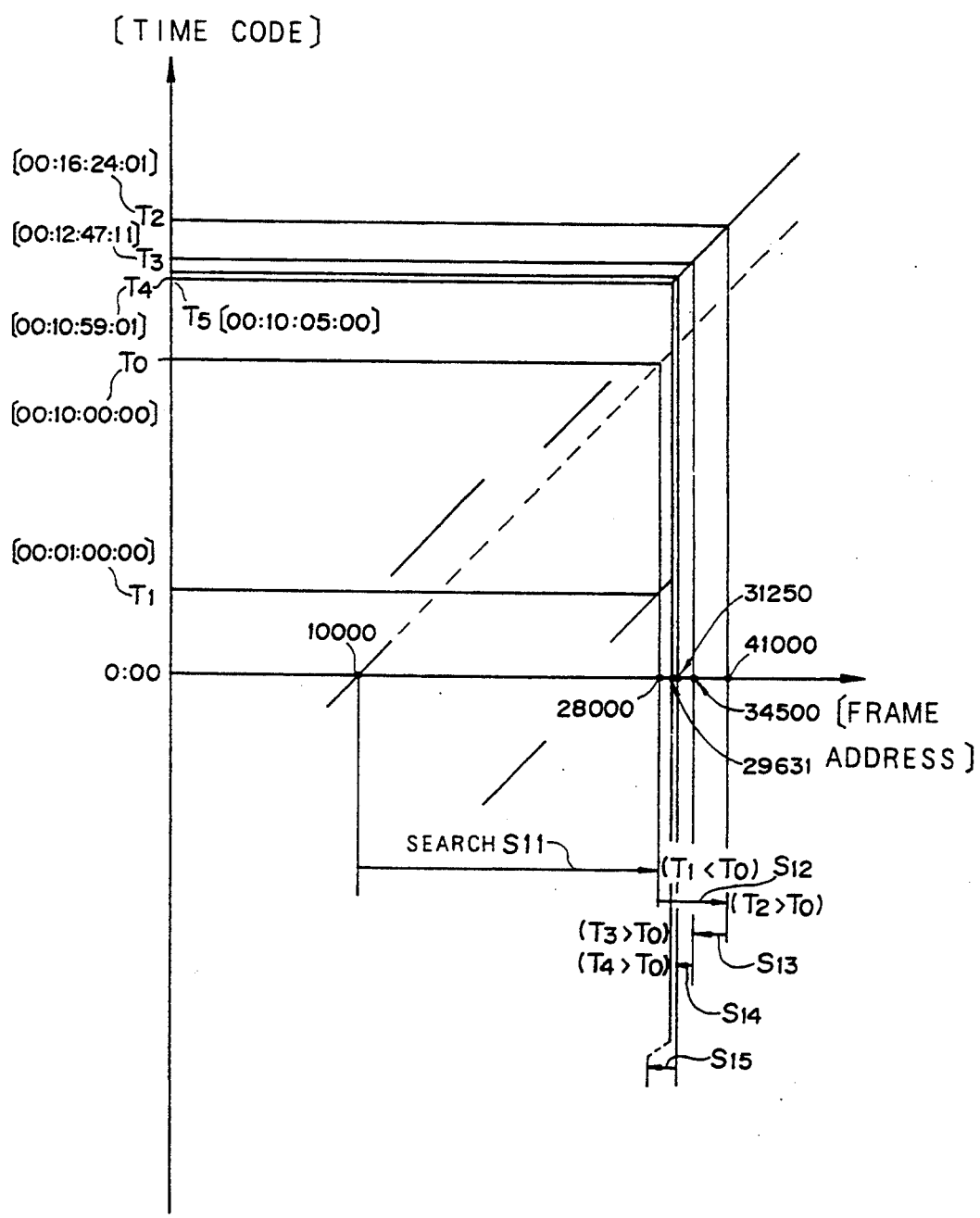
FIG. 15 is a diagram showing another example of a time code recording manner on a disk.

FIGS. 14 and 15 show examples of time code recording manners of a recording disk. FIG. 14 shows a case where a proportional relationship is satisfied between the frame address and the time code, and FIG. 15 shows a case where proportional relationship is not satisfied between the frame address and the time code.

In FIG. 3, on the basis of the RF signal outputted from the pickup 1 and transmitted via the demodulation device 2, the current frame address="10000" and the current time code="00:00:00:01" are detected by the frame address detection device 3 and the time code detection device respectively. Then, the current frame address is supplied to the latches 7a and 7b and the calculation devices 12 and while the current time code is supplied to the calculation device 21.

Then, the subtraction calculation is carried out between the current time code="00:00:00:01" supplied to the calculation device 21 and the target time code="00:10:00:00" inputted from the key input device 5. In this case, since the time code at the search start time is "00:00:00:01", the time code inputted to the converting devices 21c and 21d would be coincident with the time code outputted therefrom, respectively, if these time codes are within "12:00:00:00". The absolute value of the subtraction result (="00:10:00:00") is supplied to the converting device 22 and the comparator 23a, and the sign signal A of the subtraction result (="H"-level) is supplied to the calculation device 12, the signal selection devices 17 and 18, the latch 23c and the gate 24. The converting device 22 converts the time code difference (="00:10:00:00") supplied from the calculation device 21 into the corresponding frame address number (="18000"), and the output thereof is inputted to the "L"-side input terminal of the change-over switch 16a.

Subsequently, the time code search start signal C is transmitted to the search start signal generator 4, the signal selection devices 14, 15, 16 and 17 and the time code search terminating signal generator 25 in response to a push down operation of the switch SW1. Each of the signal selection devices 14, 15, 16 and 17 receives the time code search start signal C and selects the "L"-side terminal. According to the selecting operations, the calculation device 12 receives the output of the calculation device 22, that is, the frame address number "18000", and carries out a calculation between the input frame address number and the previously-input current frame address "10000". In this case, the frame numbers are added because the sign signal A outputted from the calculation device 21 is "H"-level. The calculation result "28000" is supplied to the latch 7c. That is, in this case, the latch 7c is supplied with a frame address corresponding to a target time code calculated on the assumption that the time codes are continuously and proportionally recorded on the disk.

In response to the time code search start signal C, the search start signal generator 4 generates the search start signal B by the gate 4a and MMV 4b. The latch 7a latches the current frame address "10000" in response to the search start signal B, and transmits it to the comparator 8 and the signal selection device 14. The latch 7b is supplied with the search start signal B passed through the gate 24 because the sign signal A of the calculation device 21 is in "H"-level, and thus the latch 7B latches the current frame address "10000". On the other hand, the latch 7c latches the target frame address="28000" serving as a first search target in response to the search start signal B, and the output of the latch 7c is supplied to the comparator 8 through the signal selection device 15.

As a result of the above operations, a shift distance "18000" is supplied from the comparator 8 to the search control device 9. The search control device 9 carries out a search control on the basis of the shift distance information supplied from the comparator 8 and generates a search terminating signal D when the pickup 1 is shifted and reached the position of the first target frame address "28000" (search $S_1$).

Subsequently, when the search terminating signal D is transmitted to the tracking control device (not shown), a tracking control is carried out, and a time code "01:00:00:00" which is actually recorded on the disk at the target frame address "28000" (see. FIG. 14) is detected by the pickup 1, the demodulation device 2 and the time code detection device 20.

Upon receipt of the search terminating signal D, the signal selection device 16 switches the change-over switch 16a to the H side by the change-over control device 16b. This state is kept until the time code search start signal C is inputted again.

Next, in the calculation device 21, the calculation between the target time code "00:10:00:00" and the current time code "01:00:00:00" is carried out, and the absolute value of the calculation result (="00:50:00:00") and the sign signal A (="L"-level) are transmitted to the above devices, respectively. Upon receipt of the "L"-level sign signal A, the change-over control device 17 connects the change-over switch 17a to the "H"-side input terminal.

The calculation device 13 carries out the subtraction calculation between the output of the signal selection device 17, that is, the frame address "10000" which is the output of the latch 7a and the current frame address "28000", and transmits a divided result "9000" which is obtained by dividing the subtraction result (="18000") by 2 to the calculation device 12. Since the sign signal A is "L"-level signal, the calculation device 12 carries out the subtraction calculation between the above divided result="9000" and the current frame address="28000" and the calculation result="19000" is supplied to the latch 7c.

On the other hand, upon receipt of the search terminating signal D, the comparator 4d compares the target time code "00:10:00:00" with the current time code "01:00:00:00" to judge whether these time codes are coincident with each other. In this case, these time codes are incoincident with each other, and thus a "H"-level signal is supplied to the latch 4c. When the output signal of the comparator 4d is in "H"-level indicating the incoincidence, the latch 4c detects the rising edge of the above "H"-level signal to latch the search terminating signal D at the detected timing, and the "L"-level output signal of the latch 4c is transmitted through the gate 4a to the MMV 4b thereby generating a next search start signal B. The latches 7a and 7c latch the current frame address "28000" and the target frame address "19000", respectively, and the comparator 8 outputs the shift distance "−9000" which is the subtraction result. On the basis of the shift distance "−9000", the shift control of the pickup 1 is carried out in the search control device 9, so that the pickup 1 is shifted to the position corresponding to the frame address "19000", and the search terminating signal D is generated from the search control device 9 (search $S_2$).

Upon receipt of the search terminating signal D, the tracking control device (not shown) carries out the tracking control to output the current time code "00:09:22:03" (see FIG. 14) by the pickup 1, the demodulator 2 and the time code detection device 20. Then, the calculation between the current time code and the target time code "00:10:00:00" is carried out again in the calculation device 21, so that the sign signal A (="H"-level) is outputted. On the basis of this calculation result, the same operation as described above is carried out, and the search operation of the outer-peripheral direction to the next target frame address "23500" is carried out (search $S_3$).

Subsequently, the time code "00:30:00:00" corresponding to the target frame address "23500" is detected. Then, the same operation as described above is executed so that the sign signal A which is the output of the calculation device 21 is set to "L"-level and the search operation in the inner-peripheral direction to the next target frame address "21250" is carried out (search $S_4$).

Similarly, when a time code "00:10:15:00" at a target frame address="21250" is detected, the subtraction calculation between the detected time code and the target time code is carried out, and the inner-peripheral direction search operation to a next target frame address "20125" is carried out on the basis of the sign signal A (="L"-level) which is obtained as the above calculation result (search $S_5$).

The above operation is repeated until the difference between the target time code and the current time code obtained after the search operation becomes within the predetermined frame difference which is set by the difference setting device 23b, for example, within 12 frames, or until the shift distance in the next search operation obtained in the calculation device 13 becomes within the frame address difference number which is set in the address difference setting device 19b, for example, within 6 frame addresses.

In FIG. 14, now assuming that a time code detected after the execution of the search $S_5$ is equal to "00:09:59:18", the absolute value outputted from the calculation device 21 becomes within 12 (frames), and thus the output of the comparator device 23a is set to "H"-level. The output of the latch 23c is set to "H"-level in response to the rising edge of the "H"-level signal from the comparator 23a to inhibit the output of the MMV 4b, and thus the search start signal B is not outputted until the switch SW1 is pushed down again. Therefore, the pickup 1 is shifted in a normal shift mode by the tracking control. Further, a "H"-level signal is transmitted through the gate 25e to the comparator 25a and the counter 25c to release the output inhibiting state of each of the above associated elements.

Then, the pickup 1 reproduces recorded information on the disk in the normal operation, and the time code and the frame address are read out by the demodulator 2, the frame address detection device 3 and the time code detection device 20. This operation is continued until the counter 25c counts the detection judging signal F outputted from the frame address detection device 3 at a predetermined number of times, for example, 12 times, or until the frame address reaches a frame address at which the output signal of the comparator 25a is set to "H"-level.

Accordingly, in this embodiment, the normal shift operation is carried out until the frame address "20137" at which the current time code is coincident with the target time code, and then the pose jump is carried out to terminate the time code search when the comparator 25a transmits the time code search terminating signal G via the gate 25d to the pose jump control device.

Next, the time code search operation to the target time code "00:10:00:00" in a case where the proportional relationship between the frame address and the time code is not satisfied as shown in FIG. 15 will be described.

First, similar to the case as described above, a target frame address is calculated by the calculation devices 12, 21 and 22, on the assumption that the time codes are continuously recorded from the current frame address "10000". Then, the search operation to a target frame address "28000" thus obtained is carried out (search $S_{11}$).

When the time code $T_1$ "00:01:00:00" at the current frame address="28000" is detected and comparison between the time code $T_1$ and a target time code $T_0$ "00:10:00:00" is executed, the sign signal A outputted from the calculation device 21 becomes "H"-level because $T_1 < T_0$, so that the frame address setting device 18a is connected in the change-over switch 18. Then, a frame address "41000" which is located at a center position between the frame address "54000" set in the frame address setting device 18a and the current frame address "28000" is calculated by the calculation devices 12 and 13, and the search operation is carried out using the calculated frame address as a target frame address (search $S_{12}$). Simultaneously, since the search $S_{12}$ in performed in the outer-peripheral direction, the current frame address "28000" is latched by the latch 7b.

When a time code $T_2$ "00:16:24:01" corresponding to the current frame address "41000" is detected and the comparison operation between the time code $T_2$ and the target time code $T_0$ is carried out, the sign signal A outputted from the calculation device 21 becomes "L"-level because $T_2 > T_0$. Therefore, in the change-over switch 17a, the connection to the "H"-side input terminal is selected, and a frame address "34500" at a center position between the frame address="28000" to be next searched and the frame address "41000" is calculated by the calculation devices 12 and 13. Then, the search operation to the target frame address "34500" is carried out (search $S_{13}$). Then, a current time code $T_3$ "00:12:47:11" at that position is detected, and the current time code is compared with the target time code $T_0$. In this case, since $T_3 > T_0$, the sign signal A outputted from the calculation device 21 is continuously kept to be "L"-level, and the change-over switch 14a selects the "H"-side input terminal, that is, the latch 7b. Therefore, the set frame address transmitted to the calculation device 13 becomes equal to "28000", and a next target frame address becomes a frame address "31250" which is located at a center position between the frame address "28000" and the frame address "34500".

Subsequently, the search operation to the target frame address "31250" is carried out (search $S_{14}$), a time code $T_4$ "00:10:59:01" corresponding to the frame address "31250" is detected and the time code $T_4$ and the target time code $T_0$ are compared with each other. In this case, since $T_4 > T_0$, a next target frame address "29625" is calculated, and then the search operation thereto is carried out (search $S_{15}$: shown enlarged in FIG. 15).

When a time code "00:01:01:20" corresponding to the frame address "29625" is detected, the sign signal A is set to "H"-level. Therefore, the change-over switch 14a is connected to the "H"-side, and the frame address "31250" which is the output of the latch 7b is supplied via the change-over switches 14a and 17a to the calculation device 13, and a next target frame address "30437" is supplied through the calculation device 12 to the comparator 8.

The same search operation is subsequently repeated, and when the output of the calculation device 13, that is, the shift distance becomes within "6", the output of the comparator 19a is set to "H"-level and transmitted to the change-over control device 15b. By this operation, the change-over switch 15a is connected to the "H"-side input terminal, and the output of the latch 7, that is, the address at the latest search in the outer-peripheral direction is obtained as a target frame address. Now, assuming that the output of the latch 7b is a frame address "29625", the pickup 1 is transferred to the position corresponding to the frame address "29625" and then detects the time code by the normal operation of the tracking control. When the time code search terminating signal G outputted from the time code search terminating generator 25 is set to "H"-level at the frame address "29631", for example, the pose jump control device (not shown) carries out the pose jump operation, and the search operation is terminated. The time code $T_5$ "00:10:05:00" corresponding to the frame address "29631" is not equal to the time code $T_0$ but is a time code having a value nearest to $T_0$ in time codes having values larger than $T_0$.

In this embodiment, the preset data in the address difference setting device 19b is "12 time code frames" and the preset data of the difference detection device 23b is "6 frame addresses", respectively. However, this invention is not limited to this feature. These values may be altered to any values in accordance with a search time and a search accuracy if occasion demands.

Further, in this embodiment, the output of the counter 25c is also transmitted to the pose jump control device (not shown). This is a countermeasure for a case where the comparator 25a can not output a "H"-level signal when no time code above the target time code exists on the disk. That is, this countermeasure is used to accurately converge the time code search even in such a case. That is, after a desired time code is roughly searched through the search operation, then a predetermined number of addresses are passed through a trace operation and the time code search terminating signal G is forcibly generated. If this predetermined number is set to 12 frame addresses, since the time code difference is within 12 time code frames or the shift distance after the rough search is within 6 frame addresses, the time code search operation is converged in the neighborhood of the roughly-searched time code.

In the above embodiment, the foregoing description was made for a case where the search operation is carried out in the outer-peripheral direction from the current time code, and the search operation in the inner peripheral direction from the current time code can be carried out in the same manner. However, in this case, if no search operation in the outer-peripheral direction is carried out during the inner-peripheral search operation, the latch 7b holds a frame address "1", and the trace operation is started from the position corresponding to the frame address "1".

According to this invention, the large-and-small relationship between time codes is determined to obtain a shift direction and a current position while successively comparing these time codes with one another, and a shift range of the reproducing position of the pickup 1 is set on the basis of the shift direction and the position information. The pickup 1 is shifted from the latest starting position of the outer-peripheral direction search when the shift distance is within a predetermined value and shifted from the current position when the difference between the successively-compared time codes is within a predetermined value. Then, the search operation is terminated at a position corresponding to the frame address having a time code which is equal to or larger than the target time code, or at a position where the frame address number exceeds a predetermined number. Therefore, the time code search can be converged even if no desired time code exits. In addition, even when the values of recorded time codes are not continuous or proportional, the convergence of the time code search can be accurately performed in a short time.

What is claimed is:

1. A device for searching a target time code recorded on a disk on which time codes and continuous frame addresses are recorded, said device comprising:

a pick up for reproducing information including a current time code and a current frame address corresponding to a current reproduction position of the pickup from said disk;

means for calculating a time code difference between a target time code and a current time code reproduced by said pickup;

means for setting a target frame address on the basis of the calculated time code difference and the current frame address reproduced by said pickup;

means for calculating shift information comprising a shift distance and a shift direction from the current reproduction position to the position of the target frame address on the basis of the target frame address and the current frame address;

means for shifting said pickup on the basis of the shift information;

means for storing the current frame address when said shifting means shifts said pickup in an outer peripheral direction of the disk; and means for allowing the pickup to continuously reproducing information from the disk from the position of the current frame address stored in said storing means when the shift distance becomes within a predetermined distance value or when the time code difference becomes within a predetermined difference value until the current reproduction position reaches the reproduction position whose time code is near the target time code.

2. A device according to claim 1, further comprising means for inputting the target time code.

3. A device according to claim 1, wherein said target frame address setting means sets the target frame address to a sum of the current frame address and the address value corresponding to the time code difference when the current time code is smaller than the target time code, and sets the target frame address to a half of the sum of the current frame address and the address stored in said storing means when the current time code is larger than the target time code.

4. A method of searching a target time code recorded on a disk on which time codes and continuous frame addresses are recorded by a pickup, said method comprising the steps of:

reproducing information including current time code and current frame address corresponding to a current reproduction position of the pickup from said disk;

calculating a time code difference between a target time code and a current time code reproduced by said pickup;

setting a target frame address on the basis of the calculated time code difference and the current frame address reproduced by said pickup;

calculating shift information comprising a shift distance and a shift direction from the current reproduction position to the position of the target frame address on the basis of the target frame address and the current frame address;

shifting said pickup on the basis of the shift information;

storing the current frame address when said shifting step shifts said pickup in an outer peripheral direction of the disk;

repeating said information reproducing step to storing step until the shift distance becomes within a predetermined distance value or the time code difference becomes within a predetermined difference value; and allowing the pickup to continuously reproducing information from the disk from the position of the current frame address stored in said storing step until the current reproduction position reaches the reproduction position whose time code is near the target time code.

5. A method according to claim 4, further comprising a step of inputting the target time code.

6. A method according to claim 4, wherein said target frame address setting step sets the target frame address to a sum of the current frame address and the address value corresponding to the time code difference when the current time code is smaller than the target time code, and sets the target frame address to a half of the sum of the current frame address and the address stored in said storing step when the current time code is larger than the target time code.

* * * * *